United States Patent
Bartel et al.

(10) Patent No.: US 6,808,851 B2
(45) Date of Patent: Oct. 26, 2004

(54) EMULSION AGGREGATION TONER CONTAINING A MIXTURE OF WAXES INCORPORATING AN IMPROVED PROCESS TO PREVENT WAX PROTRUSIONS AND COARSE PARTICLES

(75) Inventors: Joseph A. Bartel, Dublin, CA (US); Patricia A. Burns, Milton (CA); Raj D. Patel, Oakville (CA); Enno E. Agur, Toronto (CA); Danielle C. Boils, Mississauga (CA); Edward G. Zwartz, Mississauga (CA); Paul J. Gerroir, Oakville (CA); Maria N. V. McDougall, Burlington (CA)

(73) Assignee: Xerox Corporation, Stamford, CT (US)

(*) Notice: Subject to any disclaimer, the term of this patent is extended or adjusted under 35 U.S.C. 154(b) by 71 days.

(21) Appl. No.: 10/248,393

(22) Filed: Jan. 15, 2003

(65) Prior Publication Data

US 2004/0137357 A1 Jul. 15, 2004

(51) Int. Cl.⁷ .............................................. G03G 9/083
(52) U.S. Cl. .............................. 430/108.1; 430/108.8; 430/108.6; 430/137.14
(58) Field of Search ..................... 430/108.1, 108.8, 430/108.6, 137.14

(56) References Cited

U.S. PATENT DOCUMENTS

| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,482,812 A | 1/1996 | Hopper et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,688,625 A | 11/1997 | Bertrand |
| 5,853,943 A | 12/1998 | Cheng et al. |
| 5,994,020 A | 11/1999 | Patel et al. |
| 6,210,853 B1 | 4/2001 | Patel et al. |
| 6,294,606 B1 | 9/2001 | Chen et al. |
| 6,656,658 B2 * | 12/2003 | Patel et al. ............. 430/137.14 |

* cited by examiner

Primary Examiner—Mark A. Chapman
(74) Attorney, Agent, or Firm—Oliff & Berridge, PLC (57) ABSTRACT

A process for the preparation of emulsion aggregation toner particles with high pigment loading having a reduced number of wax protrusions on the surface of the toner particles and fewer coarse toner particles. The process includes the introduction of a wax having a molecular weight between about 500 and 2,500, or a blend of waxes having different a molecular weight between 500 and 2,500.

21 Claims, 4 Drawing Sheets

EMULSION AGGREGATION TONER CONTAINING A MIXTURE OF WAXES INCORPORATING AN IMPROVED PROCESS TO PREVENT WAX PROTRUSIONS AND COARSE PARTICLES

BACKGROUND OF THE INVENTION

1. Field of Invention

The present invention relates generally to toners and toner processes, and more specifically, relates to emulsion aggregation toner compositions containing wax having a reduction of wax protrusions and coarse particles.

2. Description of Related Art

The art of preparing an emulsion aggregation (EA) type toner is known in the art and forms toners by aggregating a colorant with a latex polymer formed by batch or semi-continuous emulsion polymerization. For example, U.S. Pat. No. 5,853,943 (hereinafter "the '943 patent"), which is herein Incorporated by reference, is directed to a semi-continuous emulsion polymerization process for preparing a latex by first forming a seed polymer. In particular, the '943 patent describes a process comprising:

(i) conducting a pre-reaction monomer emulsification which comprises emulsification of the polymerization reagents of monomers, chain transfer agent, a disulfonate surfactant or surfactants, and optionally, but preferably, an initiator, wherein the emulsification is accomplished at a low temperature of, for example, from about 5° C. to about 40° C.:

(ii) preparing a seed particle latex by aqueous emulsion polymerization of a mixture comprised of (a) part of the monomer emulsion, from about 0.5 to about 50 percent by weight, and preferably from about 3 to about 25 percent by weight, of the monomer emulsion prepared in (i), and (b) a free radical Initiator, from about 0.5 to about 100 percent by weight, and preferably from about 3 to about 100 percent by weight, of the total initiator used to prepare the latex polymer at a temperature of from about 35° C. to about 125° C., wherein the reaction of the free radical initiator and monomer produces the seed latex comprised of latex resin wherein the particles are stabilized by surfactants;

(iii) heating and feed adding to the formed seed particles the remaining monomer emulsion, from about 50 to about 99.5 percent by weight, and preferably from about 75 to about 97 percent by weight, of the monomer emulsion prepared In (ii), and optionally a free radical initiator, from about 0 to about 99.5 percent by weight, and preferably from about 0 to about 97 percent by weight, of the total Initiator used to prepare the latex polymer at a temperature from about 35° C. to about 125° C.; and (iv) retaining the above contents In the reactor at a temperature of from about 35° C. to about 125° C. for an effective time period to form the latex polymer, for example from about 0.5 to about 8 hours, and preferably from about 1.5 to about 6 hours, followed by cooling.

Other examples of emulsion/aggregation/coalescing processes for the preparation of toners are illustrated in U.S. patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. Also of interest may be U.S. Pat. No. 5,348,832, U.S. Pat. No. 5,405,728, U.S. Pat. No. 5,366,841, U.S. Pat. Nos. 5,496,676, 5,527,658, U.S. Pat. No. 5,585, 215, U.S. Pat. No. 5,650,255, U.S. Pat. No. 5,650,256 and U.S. Pat. No. 5,501,935.

In addition, examples of wax containing toners, the disclosures of which are incorporated herein by reference in their entireties, include U.S. Pat. No. 5,482,812, U.S. Pat. No. 5,688,625, U.S. Pat. No. 5,994,020, U.S. Pat. No. 6,210,853 and U.S. Pat. No. 6,294,606.

For toner compositions with low gloss and high transmission optical density for low oil or oil-less fuser applications, it is preferable to incorporate high levels of colorant, wax and crosslinked latex resin. Such toners prepared generally result in particles with excessive wax protrusions at the toner surface which result in poor particle size, poor particle size distribution control, and unstable triboelectric charging performance.

The said wax protrusions tend to develop on the surface of the toner, therein producing coarse particles, during a cooling stage wherein the toner slurry is cooled to an appropriate working temperature of about 25° C. However, the wax is advantageously included in the particles because it aids in fusing release.

Additive loading can also be performed to mask wax protrusions on the toner. However, additive loading may also lead to the development of coarse particles that must then be separated from the good toner particles. Separating the coarse particles and additive loading increases the costs associated with the production of the toner.

SUMMARY OF THE INVENTION

The present invention embodies a means by which wax protrusions and coarse particles can be reduced in emulsion aggregation toners while still obtaining the advantageous aspects of the wax at a reasonable expense.

In one embodiment of the present invention, a wax having a higher molecular weight is introduced in the toner formulation process. A significant reduction in wax protrusions requires that a wax be chosen that has a melt distribution substantially above the coalescence temperature of the toner. A higher molecular weight wax causes the melt distribution of the system to shift towards a higher temperature.

In another embodiment, waxes of different molecular weights are introduced into the toner formulation process. In a preferred approach, the two or more waxes are melt homogenized. The resulting aqueous wax dispersion is then incorporated into the toner formulation process.

In another preferred approach, two or more wax dispersions are melt mixed together before homogenization. The resulting aqueous wax dispersion is then incorporated into the toner formulation process.

BRIEF DESCRIPTION OF THE DRAWINGS

Other features of the present invention will become apparent as the following description proceeds and upon reference to the drawings, in which.

DETAILED DESCRIPTION OF EXEMPLARY EMBODIMENTS

In embodiments of the present invention, the toners are prepared by chemical processes which involve the aggregation and fusion of latex resin particles with colorant (preferably pigments), wax and optionally additive toner particles into toner sized aggregates. The aggregation and fusion is followed by coalescence or fusion by heating of the resulting aggregates to form integral toner particles, wherein the aggregation is preferably controlled primarily by utilizing a coagulant of polyaluminum chloride (PAC). Preferably, there is a latex comprised of, for example, submicron non-crosslinked resin particles in the size range of, for example, about 50 to about 500 nanometers in volume average diameter, suspended in an aqueous phase of water, nonionic and anionic surfactants and optionally suspended in an anionic surfactant to which is added a latex comprised of, for example, submicron crosslinked resin particles in the size range of, for example, about 10 to about 200 nanometers in volume average diameter, suspended in an aqueous phase of water, nonionic and anionic surfactants and optionally suspended in an anionic surfactant, a colorant dispersion comprising, for example, submicron colorant particles in the size range of, for example, about 50 to about 500 nanometers in volume average diameter, anionic surfactant, or a nonionic surfactant, or mixtures thereof, and a wax dispersion comprising, for example, submicron wax particles in the size range of about 50 to about 500 nanometers in volume average diameter suspended In an aqueous phase of water and an anionic surfactant, wherein the resultant blend is preferably stirred and heated to a temperature below the resin glass transition temperature (Tg). This results In aggregates to which a second latex is added, wherein the second latex comprises, for example, submicron non-crosslinked resin particles, followed by adjusting the pH of the mixture with a base, and heating the mixture to a temperature above the resin Tg. The pH of the mixture is lowered with, for example, an acid to coalesce the toner aggregates. The mixture is then cooled, washed and dried.

The present invention preferably embodies the aggregation of latex containing non-crosslinked and crosslinked resin particles, colorant, and wax in the presence of polyaluminum chloride. The resultant blend is preferably stirred and heated to a temperature below the resin Tg, resulting in aggregates to which is optionally added to a second latex comprised of, for example, submicron non-crosslinked resin particles. The pH of the mixture is adjusted with a base, and the mixture is subsequently heated to a temperature above the resin Tg. The pH of the mixture is then lowered with, for example, an acid to coalesce and the aggregates, and then the mixture is cooled, washed and dried.

The toner compositions generated with embodiments of the present invention comprise, for example, a volume average diameter preferably of about 1 micron to about 25 microns, and preferably of about 3 microns to about 15 microns, more preferably of about 4 microns to about 8 microns, without the need to resort to conventional pulverization and classification methods. The generated toner comprises a narrow particle size distribution preferably of, for example, about 1.0 to about 1.33, and more preferably about 1.15 to about 1.25. The size and size distribution is preferably measured with a Coulter Counter.

Furthermore, embodiments of the present invention enable minimum washing, for example, about 2 to about 4 washings, to provide a suitable stable toner triboelectrical charge. The generated toners can be selected for known electrophotographic imaging and printing processes, including, for example, digital color processes.

The toners generated with embodiments of the present invention are especially advantageous for imaging processes, especially xerographic processes, which typically demand a toner transfer efficiency in excess of about 90 percent, such as those with a compact machine design without a cleaner or those that are designed to provide high quality colored images with excellent image resolution, acceptable signal-to-noise ratio, and image uniformity. Further, toners of the embodiments of the present invention can be selected for digital imaging systems and processes.

The present invention relates to toner compositions wherein the toner possesses stable triboelectric charging properties, and upon fusing provides a desired gloss level, high-quality document release and offset, with a desired minimum fixing temperature (MFT), and high-quality transmission optical density;

Another process embodying a preparation of toner of the present invention comprises, (i) blending a latex, an aqueous colorant dispersion, a wax dispersion and a gel latex, wherein the latex comprises a non-crosslinked resin suspended in an aqueous phase in the presence of an Ionic surfactant and water, the aqueous colorant dispersion comprises a colorant, water, and an ionic surfactant, the wax dispersion comprises at least two waxes each having a different molecular weight between the range of about 500 and about 2,500, water, and an ionic surfactant, and the gel latex comprises crosslinked resin particles suspended in an aqueous phase in the presence of an ionic surfactant and water, (ii) aggregating the above blend in the presence of a coagulant, to produce a mixture, (iii) heating the mixture below about, or about equal to the glass transition temperature (Tg) of the non-crosslinked resin to form toner aggregates, (iv) adding a second latex to the toner aggregates to form an aggregated suspension, wherein the second latex comprises a second non-crosslinked resin suspended in an aqueous phase containing an ionic surfactant and water, (v) adding a base to increase the pH of the aggregated suspension, (vi) heating the aggregate suspension above about, or about equal to the Tg of the non-crosslinked latex resin, (vii) coalescing the aggregates by lowering the pH of the said aggregated suspension with an acid, (viii) cooling to about room temperature, (i) preferably washing a resulting toner slurry; and (x) preferably isolating the toner.

Another process embodying a preparation of toner of the present Invention comprises: (i) blending a latex, an aqueous colorant dispersion, a wax dispersion and a gel latex, wherein the latex comprises a non-crosslinked resin suspended in an aqueous phase in the presence of an ionic surfactant and water, the aqueous colorant dispersion comprises a colorant, water, and an ionic surfactant, the wax dispersion comprises at least two waxes each having a different molecular weight between the range of about 500 and about 2,500, water, and an ionic surfactant, and the gel latex comprises crosslinked resin particles suspended in an aqueous phase in the presence of an ionic surfactant and water; (ii) aggregating the above blend in the presence of a coagulant, to produce a mixture; (iii) heating the mixture below about, or about equal to the glass transition temperature (Tg) of the non-crosslinked resin to form toner aggregates, (iv) adding a second latex to the toner aggregates to form an aggregated suspension, wherein the second latex comprises a second non-crosslinked resin suspended in an aqueous phase containing an ionic surfactant and water; (v) adding a base to increase the pH of the aggregated suspension; (vi) heating the aggregate suspension above about, or about equal to the Tg of the non-crosslinked latex resin, (vii) coalescing the aggregates by lowering the pH of the said aggregated suspension with an acid; (viii) cooling to about room temperature; (ix) preferably washing a resulting toner slurry; and (x) preferably isolating the toner. In preferred embodiments of the present invention, the latex is prepared by a batch and or a semicontinuous polymerization resulting in submicron non-crosslinked resin particles suspended in an aqueous phase containing ionic surfactant.

In preferred embodiments of the present invention, the latex is prepared by a batch and or a semicontinuous polymerization resulting in submicron non-crosslinked resin particles suspended in an aqueous phase containing ionic surfactant.

In other embodiments of the present invention, the latex is derived from the emulsion polymerization of monomers selected from styrene, butadiene, acrylates, isoprene, methacrylates, acrylonitrile, acrylic acid, methacrylic acid, itaconic or beta carboxy ethyl acrylate (β-CEA) and the like, wherein latex contains an anionic surfactant, such as sodium dodecylbenzene sulfonate (SDS). Known chain transfer agents, for example dodecanethiol, in amounts of, for example, about 0.1 to about 10 percent, or carbon tetrabromide in effective amounts, such as, for example, from about 0.1 to about 10 percent, can also be utilized to control the molecular weight properties of the resin if prepared by emulsion polymerization.

The latex of preferred embodiments of the invention comprises submicron non-crosslinked resin particles of about 50 to about 500 nanometers, more preferably about 70 to about 350 nanometers, suspended in an aqueous water phase containing an ionic surfactant, wherein the ionic surfactant is selected in an amount from about 0.5 to about 5 percent by weight, more preferably from about 0.7 to about 2 percent by weight of the solids.

The non-crosslinked resin is generally present in the toner composition of preferred embodiments of the present invention from about 75 weight percent to about 98 weight percent, preferably from about 80 to about 95 weight percent of the toner or of the solids. The non-crosslinked resin preferably has a size of about 0.05 micron to about 0.5 micron in volume average diameter as measured, for example, by a Brookhaven nanosize particle analyzer.

The non-crosslinked resin of the latex is preferably one or more of poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly (styrene-alkyl methacrylate-acrylic acid), poly(alkyl methacrylate-alkyl acrylate), poly (alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), and poly(alkyl acrylate-acrylonitrile-acrylic acid); poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly (styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly (acrylonitrile-butyl acrylate-acrylic acid), and mixtures thereof. A most preferred polymer is poly (styrene/butyl acrylate/beta carboxyl ethyl acrylate).

Other processes for obtaining resin particles of, for example, about 0.01 micron to about 7 microns can be produced by a polymer microsuspension process, such as disclosed in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding processes, or other known processes. Also, reactant initiators, chain transfer agents, and the like can be used for the processes of the present invention. Examples of water soluble initiators include, ammonium sodium, and potassium persulfates in suitable amounts, of about 0.1 to about 8 percent by weight of monomer, and more preferably of from about 0.2 to about 5 percent by weight of monomer. Examples of chain transfer agents include dodecanethiol, dodecylmercaptan, octanethiol, carbon tetrabromide, carbon tetrachloride, and the like in various suitable amounts, and are of about 0.1 to about 10 percent by weight of monomer, and preferably of about 0.2 to about 5 percent by weight of monomer.

In preferred embodiments of the invention, the colorant dispersion comprises submicron pigment particles dispersed in water, an ionic surfactant and a nonionic surfactant.

The colorant dispersion of embodiments of the invention may comprise submicron colorant particles of about 50 to about 500 nanometers, preferably of about 80 to about 300 nanometers, suspended in an aqueous water phase containing an ionic surfactant, wherein the ionic surfactant is about 1 to about 25 percent by weight, and preferably about 4 to about 15 percent by weight of the colorant.

The colorant may be a pigment, a dye or mixtures thereof. Further, the colorant may be, for example carbon black, cyan, yellow, magenta, red, orange, brown, green, blue, violet or mixtures thereof.

In another embodiment, wherein the colorant is a pigment, the pigment is, for example, carbon black, phthalocyanine, quinacridone or RHODAMINE B™ type, red, green, orange, brown, violet, yellow, fluorescent colorants and the like.

Preferably, the colorant is present in embodiments of the toner of the invention in an amount of about 1 to about 25 percent by weight of toner, and more preferably in an amount of from about 2 to about 15 percent by weight.

Preferred colorants include, for example, carbon black like REGAL 330® magnetites, such as Mobay magnetites MO8029™; MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600 ™, 8610™; Northern Pigments magnetites, NP-604™, NP-608™; Magnox magnetites TMB-100™, or TMB-104™, phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours and Company, 2,9-dimethyl-substituted quinacridone and anthraqulnone dye identified in the Color Index as Cl 60710, Cl Dispersed Red 15, diazo dye identified in the Color Index as Cl 26050, Cl Solvent Red 19, copper tetra(octadecyl sulfonamido) phthalocyanine, x-copper phthalocyanine pigment listed in the Color Index as Cl 74160, Cl Pigment Blue, and Anthrathrene Blue, Identified in the Color Index as Cl 69810, Special Blue X-2137, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dye examples, preferably of a high purity for the purpose of color gamut are Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, and more specifically, from about 5 to 20 weight percent of the toner. Colorants include pigment, dye, mixtures of pigment and dyes, mixtures of pigments, mixtures of dyes, and the like.

The wax dispersion of preferred embodiments comprises submicron wax particles of about 50 to about 500 nanometers, preferably of about 100 to about 350 nanometers, suspended in an aqueous water phase containing an ionic surfactant. It is preferred that the ionic surfactant is in an amount of about 0.5 to about 10 percent by weight, and preferably of about 1 to about 5 percent by weight of the wax.

The wax dispersion according to embodiments of the present invention comprises a wax comprising a natural vegetable wax, natural animal wax, mineral wax and synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present invention include, for example, Fischer-Tropsch wax, acrylate wax, fatty acid amide wax, silicone wax, polytetrafluoroethylene wax, polyethylene wax, and polypropylene wax, and mixtures thereof.

Examples of waxes of preferred embodiments include polypropylenes and polyethylenes commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. The preferred commercially available polyethylenes usually possess a molecular weight Mw of from about 1,000 to about 1,500, while the commercially available polypropylenes utilized have a molecular weight of about 4,000 to about 5,000. Examples of functionalized waxes include amines, amides, imides, esters, quaternary amines, carboxylic acids or acrylic polymer emulsion, for example, Joncryl 74, 89, 130, 537, and 538, all available from Johnson Diversey, Inc, chlorinated polypropylenes and polyethylenes commercially available from Allied Chemical and Petrolite Corporation and Johnson Diversey, Inc.

In another preferred embodiment, the wax is polyethylene, polypropylene waxes and/or functionalized forms thereof.

It is preferred in embodiments of the invention that the wax provides adequate release of the toner in a fusing system which has none to very little oil.

In embodiments wherein the wax is a polyethylene wax, it is preferred that the wax comprise a weight average molecular weight (Mw) of about 500 to about 2,500, preferably of about 600 to about 1,500, a number average molecular weight (Mn) of about 400 to about 2,000, preferably of about 700 to about 1,500, a melting temperature of about 70 to about 130° C., preferably of about 80 to about 110° C., and a particle size of about 50 to about 500 nanometers, preferably from about 100 to about 300 nanometers.

If a polyethylene wax is present, it is preferably in an amount of about 1 to about 20 percent by weight, or more preferably of about 2 to about 15 percent by weight, of the toner. A polypropylene wax of the toner preferably, if present, is in an amount of about 1 to about 20 percent by weight, more preferably of about 2 to about 15 percent by weight, of the toner. Such polypropylene wax preferably has a Mw of about 1,000 to about 10,000, more preferably of about 4,000 to about 7,000, and a Mn of about 500 to about 8,000, more preferably from about 2,000 to about 6,000.

In embodiments wherein the wax is a polypropylene wax, it is preferred that the wax comprise a Mw of about 1,000 to about 10,000, preferably of about 4,000 to about 7,000, a Mn of about 500 to about 8,000, preferably from about 2,000 to about 6,000, a melting temperature of about 100 to about 180° C., preferably of about 100 to about 160° C., and a particle size of about 50 to about 500 nanometers, preferably from about 100 to about 300 nanometers.

In preferred embodiments, the wax Is present in an amount of about 1 to about 20 percent by weight, and preferably about 2 to about 15 percent by weight of the toner.

In embodiments of the invention wherein the wax is a mixture of two or more waxes, the ratio of the at least two waxes is in the range of about 1:99 to about 99:1, preferably about 10:90 to about 90:10, and more preferably about 25:75 to about 75:25, wherein the ratio is a weight ratio or a volume ratio.

When two or more waxes are present, the two or more waxes may embody wax dispersions uniformly dispersed together to produce a single wax dispersion.

The gel latex of preferred embodiments comprises a crosslinked resin or polymer, or mixtures thereof.

In another preferred embodiment of the present invention, the gel latex comprises a crosslinked resin of a non-crosslinked resin with crosslinking.

Preferably, the gel latex comprises submicron crosslinked resin particles of about 10 to about 200 nanometers, more preferably about 20 to about 100 nanometers, suspended in an aqueous water phase containing an ionic surfactant, wherein the surfactant is selected in an amount from about 0.5 to about 5 percent by weight, and preferably from about 0.7 to about 2 percent by weight of the solids.

The crosslinked resin preferably comprises a crosslinked polymer such as crosslinked poly(styrene-alkyl acrylate), poly(styrene-butadiene), poly(styrene-isoprene), poly(styrene-alkyl methacrylate), poly(styrene-alkyl acrylate-acrylic acid), poly(styrene-butadiene-acrylic acid), poly(styrene-isoprene-acrylic acid), poly (styrenealkyl methacrylate-acrylic acid), poly(alkyl methacrylate-alkyl acrylate), poly (alkyl methacrylate-aryl acrylate), poly(aryl methacrylate-alkyl acrylate), poly(alkyl methacrylate-acrylic acid), poly(styrene-alkyl acrylate-acrylonitrileacrylic acid), and crosslinked poly(alkyl acrylate-acrylonitrile-acrylic acid), and/or mixtures thereof.

A crosslinker, such as divinyl benzene, may be used in an effective amount of about 0.01 percent by weight to about 25 percent by weight, preferably of about 0.5 to about 10 percent by weight. Further examples of linear polymers selected are similar to, or the same as, the crosslinked polymers with the exception that the linear polymers are free of crosslinking. The crosslinked polymer when selected can contain divinyl benzene as an additional monomer during the latex formation.

In another embodiment, the crosslinked resin particles are present in an amount of about 0.1 to about 50 weight percent, preferably from about 1 to about 20 percent by weight of the toner.

In another embodiment of the present invention, a matte developed finish is observed when the crosslinked resin amount is from about 0.1 to about 70 percent by weight of the toner, preferably from about 1 to about 50 percent by weight of the toner, and more preferably from about 5 to about 20 percent by weight of the toner. The toner exhibits a low matte finish where the gloss of the toner is less than about 30 GGU, and preferably less than about 20 GGU.

Surfactants for the preparation of latexes and wax and colorant dispersions can be ionic or nonionic surfactants in an amount of about 0.01 to about 15, preferably about 0.01 to about 5 weight percent of the reaction mixture. Examples of anionic surfactants are sodium dodecylsulfate (SDS), sodium dodecylbenzene sulfonate, sodium dodecylnaphthalene sulfate, dialkyl benzenealkyl sulfates and sulfonates, abitic acid, available from Aldrich, NEOGEN R™, NEOGEN SC™ obtained from Kao, and the like. Examples of nonionic surfactants for the colorant dispersion in an amount of about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™.

Preferably, at the start of aggregating, the pH of the blend is from about 2 to about 2.6.

Preferably, the aggregating comprises stirring and heating the mixture at about a temperature below about, or about equal to, the Tg of the non-crosslinked resin.

In preferred embodiments, the aggregating occurs at a temperature of about 40° C. to about 62° C., more preferably from about 45° C. to about 58° C.

In a preferred embodiment, the coagulant is in a nitric acid solution and is added during or prior to aggregating the latex, the aqueous colorant dispersion, the wax dispersion and the gel latex over a period of preferably about 1 to about 5 minutes, more preferably over a period of about 1 to about 3 minutes, and the coagulant enables or initiates the aggregation and coalescence.

The coagulant comprises in preferred embodiments of the present invention a polymetal salt such as, for example, polyaluminum chloride (PAC), polyaluminum bromide, or polyaluminum sulfosilicate. The polymetal salt can be in a solution of nitric acid. The coagulant may be added is in about 0.02 to about 0.3 percent by weight, and preferably from about 0.05 to about 0.2 percent by weight of the toner.

Examples of coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate and the like. Preferably, the coagulant is present in an amount of about 0.05 pph to about 0.5 pph. A preferred coagulant is PAC which is commercially available, and can be prepared by the controlled hydrolysis of aluminum chloride with sodium hydroxide. Generally, the PAC can be prepared by the addition of two moles of a base to one mole of aluminum chloride. The species is soluble and stable when dissolved and stored under acidic conditions if the pH is less than 5. The species in solution is believed to be of the formula $Al_{13}O_4(OH)_{24}(H_2O)_{12}$ with 7 positive electrical charges per unit.

In a preferred embodiment, a second latex is added to the toner aggregates in an amount of about 10 to about 40 percent by weight of the initial latex, and preferably in an amount of about 15 to about 30 percent by weight, to form a shell or coating on the toner aggregates wherein the thickness of the shell is about 200 to about 800 nanometers.

In an embodiment of the present invention, the latex and the second latex comprise the same non-crosslinked resin.

In another embodiment, the latex and the second latex comprise different non-crosslinked resins.

The latex and second latex may be prepared with initiators, wherein the second latex added to the already preformed aggregates in the size range of about 4 to about 6.5 μm, include water soluble initiators, such as ammonium and potassium persulfates in suitable amounts, such as about 0.1 to about 8 weight percent, preferably about 0.2 to about 5 weight percent. Examples of organic soluble initiators include Vazo peroxides, such as Vazo 64, 2-methyl 2–2'-azobis propanenitrile, and Vazo 88, 2–2'-azobis isobutyramide dehydrate in a suitable amount, such as from about 0.1 to about 8 percent. Examples of chain transfer agents include dodecane thiol, octane thiol, carbon tetrabromide and the like in various suitable amounts, such as about 0.1 to about 10 percent, preferably about 0.2 to about 5 percent by weight of the monomer. Examples of chain transfer agents include dodecanethiol, octanethiol, carbon tetrabromide and the like in various suitable amounts of about 0.1 to about 10 percent, preferably of about 0.2 to about 5 percent by weight of the monomer.

The base of preferred embodiments of the invention comprises any suitable base such as, for example, an alkali metal hydroxides such as, for example, sodium hydroxide, potassium hydroxide, and ammonium hydroxide. The alkali metal hydroxide added may be about 6 to about 25 percent, and preferably from about 10 to about 20 percent, by weight. The base preferably increases the pH to about 5 to about 9, more preferably to about 6 to about 8.

The acid added to preferred embodiments of the present invention comprises any suitable acid such as, for example, nitric acid, sulfuric acid, hydrochloric acid, citric acid or acetic acid. The amount of acid added is from about 4 to about 30 percent by weight, and preferably from about 5 to about 15 percent, by weight. The acid preferably decreases the pH to about 2.8 to about 6, more preferably to about 3.5 to about 5.

Preferably, coalescing the toner comprises stirring and heating at a temperature of above about, or about equal to, the Tg of the non-crosslinked resin for a period from about 0.5 to about 1.5 hours.

In preferred embodiments, a temperature of the coalescing is from about 75° C. to about 97° C., and more preferably from about 85° C. to about 95° C.

Coalescing may be accelerated by additional stirring.

Coalescing, in preferred embodiments, comprises stirring and heating at a temperature of about 75° C. to about 97° C., and more preferably at a temperature of about 85° C. to about 95° C., for a period of about 0.5 to about 6 hours, and more preferably from about 2 to about 5 hours.

The cooling of the aggregated mixture is preferably slowly cooled to an ambient temperature of about 20° C. to about 40° C. over a period of about 1 to about 8 hours, and more preferably from about 1 to about 5 hours.

In another preferred embodiment, cooling a coalesced toner slurry comprises quenching by adding a cooling media such as, for example, ice, dry ice and the like, to effect rapid cooling.

Quenching is preferably feasible for small quantities of toner, such as, for example, less than 2 liters. For larger scale processes, such as for example greater than about 10 liters in size, however, rapid cooling of the toner mixture is not feasible or practical, neither by the introduction of a cooling medium into the toner mixture, nor by the use of jacketed reactor cooling.

The washing is preferably carried out at a pH of about 7 to about 12, and more preferably at a pH of about 9 to about 11, at a temperature of about 45° C. to about 70° C., and more preferably from about 50° C. to about 70° C. The washing may preferably comprise filtering and reslurrying a filter cake comprised of toner particles in deionized water. The filtering and reslurrying may preferably be washed one or more times by deionized water, or washed by a single deionized water wash at a pH of about 4 wherein the pH of the slurry is adjusted with an acid, and followed optionally by one or more deionized water washes.

The toner of preferred embodiments of the invention comprise particles having a volume average diameter of about 1 to about 25 microns, preferably about 2 to about 12 microns, and a particle size distribution of about 1.0 to about 1.28, preferably from about 1.15 to about 1.25; each measured, for example, with a Coulter Counter, wherein the toner has stable triboelectric charging performance. A narrow particle size distribution enables a clean transfer of toner particles, thereby providing enhanced resolution of the resulting developed fused images.

Preferably, the toner particles of the present invention comprise a small particle size and narrow size distribution.

The toner of the present invention's preferred embodiments has a low fusing temperature and wide fusing latitude, wherein a minimum fix temperature is about 120° C. to about 200° C., preferably about 150° C. to about 180° C., and the fusing latitude is greater than about 10° C., preferably about 10° C. to about 100° C., and more preferably about 20° C. to about 100° C.

The toner produced by preferred embodiments of the present invention has excellent blocking properties at and above about 45° C.

The toner of preferred embodiments of the invention has a low image gloss, wherein the 75 degree gloss is less than 30 GGU, preferably about 10 to about 20 GGU as measured, for example, with a BYK Gardner micro-gloss meter.

The toner of preferred embodiments of the invention preferably has a high transmission optical density, wherein the transmission optical density is greater than about 1.4, and preferably is about 1.4 to about 2.0 as measured, for example, with a Macbeth TR924 densitometer.

The toner of preferred embodiments may also include any known charge additives in amounts of about 0.1 to about 5 weight percent. Examples of such charge additives include alkyl pyridinium halides, bisulfates, the charge control additives of U.S. Pat. No. 3,944,493, U.S. Pat. No. 4,007,293, U.S. Pat. No. 4,079,014, U.S. Pat. No. 4,394,430 and U.S. Pat. No. 4,560,635, the disclosures of which are totally incorporated herein by reference, negative charge enhancing additives like aluminum complexes, and the like.

Surface additives can be added to the toner compositions of embodiments after washing or drying. Examples of such surface additives include, for example, metal salts, metal salts of fatty acids, colloidal silicas, metal oxides, strontium titanates, mixtures thereof, and the like. The surface additives are each typically present in an amount of about 0.1 to about 2 weight percent. See, for example, U.S. Pat. No. 3,590,000, U.S. Pat. No. 3,720,617, U.S. Pat. No. 3,655,374 and U.S. Pat. No. 3,983,045, the disclosures of which are totally incorporated herein by reference. Preferred additives include zinc stearate and AEROSIL R972® available from Degussa. The coated silicas of U.S. Pat. Nos. 6,190,815 and 6,004,714, the disclosures of which are totally incorporated herein by reference, can also be present in an amount of about 0.1 to about 2 percent, which additives can be added during the aggregation or blended into the formed toner product.

Developer compositions can be prepared by mixing the toners obtained with the embodiments of the present invention with known carrier particles, including coated carriers, such as steel, ferrites, and the like. See, for example, U.S. Pat. Nos. 4,937,166 and 4,935,326, the disclosures of which are totally incorporated herein by reference. The toner concentration of such developers is about 2 to about 8 percent. The carrier particles can also be comprised of a core with a polymer coating thereover, such as polymethylmethacrylate (PMMA), having dispersed therein a conductive component like conductive carbon black. Carrier coatings include silicone resins, fluoropolymers, mixtures of resins not in close proximity in the triboelectric series, thermosetting resins, and other known components.

Toners and developers of embodiments of the present invention may thus be used in imaging processes.

Figure 1:
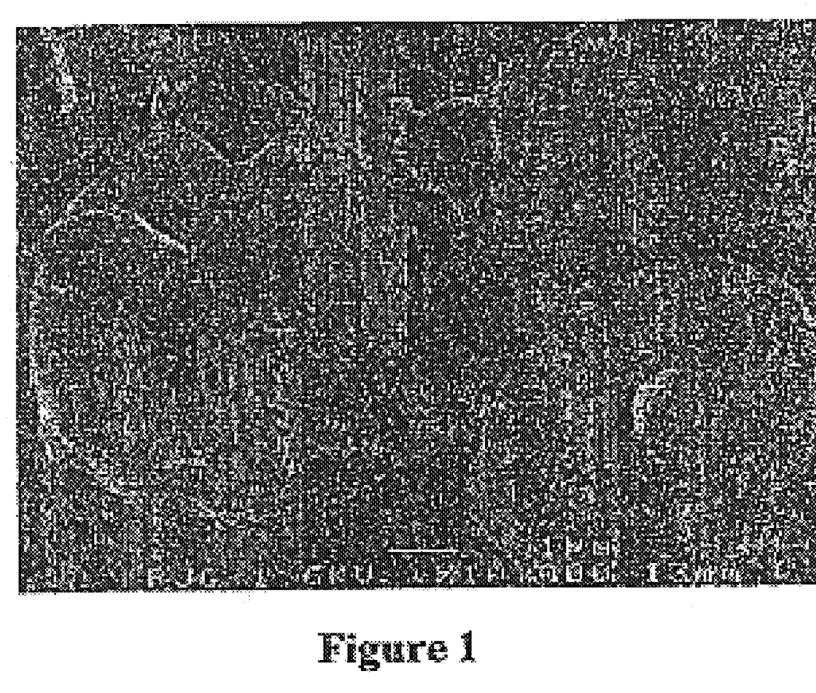
FIG. 1 is a scanning electron micrograph (SEM) image of toner having a large number of wax protrusions.

When a polyethylene wax, such as, for example, POLYWAX®500 wax with melting point of about 88° C., is utilized in the preparation of the toner, the resulting toner contains many large disk shaped wax protrusions on the surface of the toner as illustrated in FIG. 1.

The occurrence of such wax protrusions is likely due to the low melting point of the wax relative to the toner coalescence temperature. It also appears that the wax domains grow in size when the toner is cooled. Apparently, the occurrence of the wax protrusions increases with a high loading of colorant and wax, wherein the combined high loading of colorant and wax exceeds, for example, about 10 percent by weight of toner. Such wax protrusions, when excessive in number, have the several disadvantages including, for example, excessive toner particle agglomeration during cooling to room temperature resulting in particle size distribution greater than, for example, about 1.35, and development issues with respect to distribution of surface additives on the toner surface.

Figure 2:
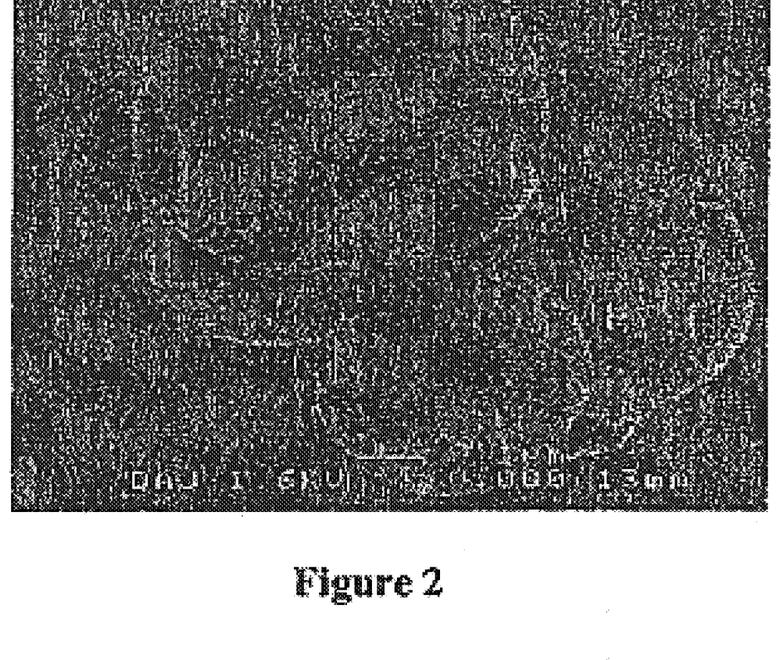
FIG. 2 is a SEM image of toner having a smaller number of wax protrusions than the toner shown in FIG. 1.

A number of solutions are provided in embodiments of the present invention to reduce the occurrence of wax protrusions at the toner surface. An example of a toner embodying the present invention is illustrated in FIG. 2, wherein the wax protrusions on the toner surface are substantially reduced and the particle size distribution and toner development satisfactory.

In one embodiment of the present invention, waxes having low molecular weights of about 500 to about 750 are incorporated into the process of making the toner, wherein there is high pigment and wax loading such that the combined loading exceeds, for example, about 15 percent by weight. After coalescing the toner, the toner slurry is quenched, that is, rapidly cooled, for example, by adding a cooling medium such as, for example, cold water, ice, dry ice or the like to the slurry. If the toner slurry is contained in a jacketed reactor, then a cooling medium such as, for example, cold water, glycol or the like can be introduced to the reactor jacket to rapidly cool the slurry. Quenching the toner slurry substantially reduces the occurrence of wax protrusions and provides a satisfactory particle size distribution less than about 1.30, preferably less than about 1.25.

In another embodiment of the present invention, waxes having high molecular weights of about 700 to about 2,500, preferably about 800 to about 2,000, are incorporated into the process of making the toner, wherein there is high pigment and wax loading such that the combined loading exceeds, for example, 15 percent by weight. The occurrence of wax protrusions is substantially reduced and satisfactory particle size distributions of less than about 1.30, preferably less than about 1.25, are obtained.

Figure 3:
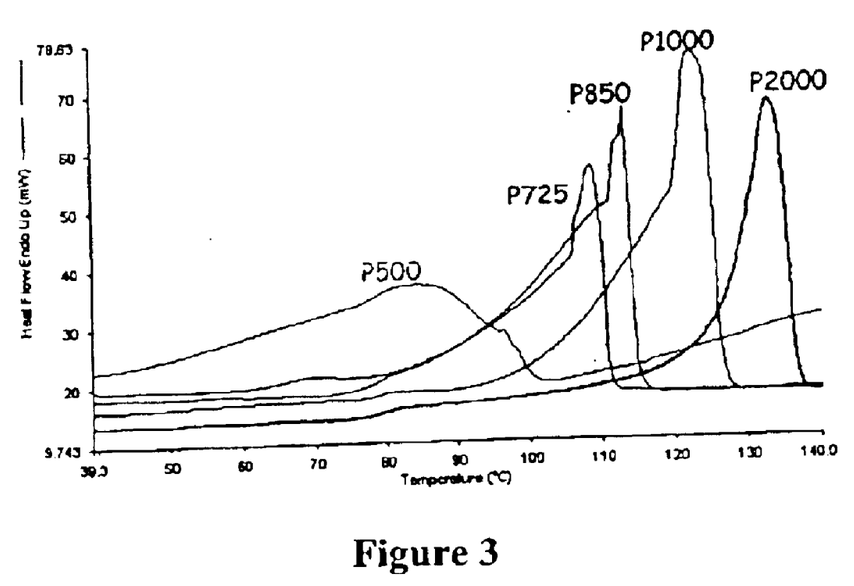
FIG. 3 is a differential scanning calorimetry (DSC) plot for different molecular weight waxes.

FIG. 3 clearly identifies that as the molecular weight of a wax is increased, the temperature range of melting (Indicated by increase in Heat Flow as measured by Differential Scanning Calorimetry (DSC)) tends to shift to a higher temperature.

Toners of particular interest contain about 10 percent by weight carbon black and about 9 percent by weight wax for a total of about 19 percent. This is considered quite high colorant and wax loading for chemical toner. When, for example, such a toner comprises POLYWAX® 500 coalescing at 93° C., substantially all of the wax is molten. Indeed, its peak melting point of 88° C. is substantially below the coalescence temperature of 93° C. When the toner is slow cooled, the wax recrystallizes and grows in size and appears as large protrusions at the toner surface. Further, such toner particles 'stick' together during cooling, presumably due to the 'sticky' hot wax at the toner surface, to form agglomerates as seen by a substantial increase in particle size distribution, typically greater than about 1.30 In this case.

However, when a higher molecular weight wax such as POLYWAX® 725 replaces the POLYWAX® 500 In the above example, wax protrusions and coarse particle growth still develop during slow cooling. The reason for the formation of the wax protrusions and coarse particle growth is understood by examination of the DSC curve of POLYWAX® 725. In the DSC curve, it is evident that POLYWAX® 725 has a peak melting point of about 108° C., which is substantially higher than the coalescence temperature of 93° C. However, the shoulder of the DSC curve starts at about 60° C. Thus, a substantial portion of the POLYWAX® 725 wax (indicated by the area under the curve below 93° C.) is molten at 93° C. During slow cooling, this molten portion recrystallizes and grown in size such that it appears as protrusions. These protrusions are not as significant as those for POLYWAX® 500, but still result in coarse particle growth.

Examination of the next higher molecular weight wax, POLYWAX® 850 indicates that the DSC shoulder of POLYWAX® 850 starts at an even higher temperature than POLYWAX® 725, and at 93° C., even a smaller portion of the POLYWAX® 850 wax will be molten. Thus, during slow cooling, less of the POLYWAX® 850 wax recrystallizes and results in smaller and fewer protrusions. Toner with POLYWAX® 850 still has some wax protrusions, but the extent is small enough that the toner particles do not stick together during slow cooling and do not have a substantial negative effect in development with respect to distribution of surface additives on the toner surface.

Higher molecular weight waxes like POLYWAX® 1000 or 2000 virtually eliminate the wax protrusion issue, as substantially none of the wax is molten at 93° C., and therefore substantially results in little or no recrystallization and wax growth occurring during cooling. One of the primary issues of using higher molecular weight waxes is that the minimum fix temperature of the toner increases.

Figure 4:
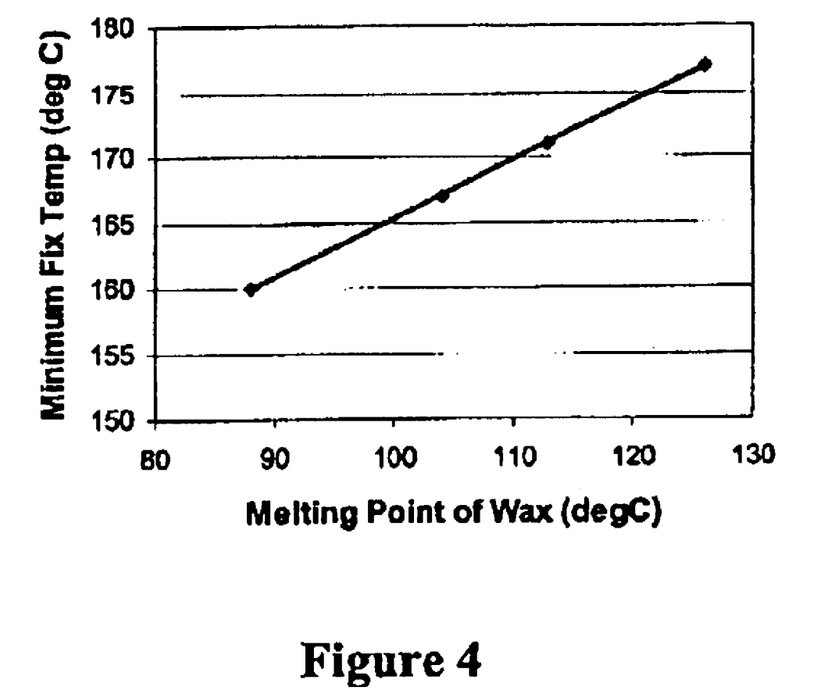
FIG. 4 is plot of the minimum fix temperature versus the melting point of waxes.

Merely increasing the molecular weight of the wax to decrease the wax protrusions on toner particles, however, may result in the loss of some desired toner properties. As shown in FIG. 4, as the wax melting point increases (an increase in molecular weight), the minimum fix temperature increases. The minimum fix temperature is the minimum temperature at which acceptable adhesion of the toner to the substrate occurs, as determined by a creasing test. Therefore, one has to determine the lowest increase in melting point of wax that will result in a satisfactory number of wax protrusions on toner particle surfaces that will result in good particle size distribution and toner development, and accept that this will result in some increase in toner minimum fix temperature.

In still another embodiment of the present invention, a mixture of two or more waxes having high molecular weights of about 500 to about 2,500, preferably about 800 to about 2,000, wherein the ratio of two waxes can range from about 1:99 to 99:1 preferably from about 10:90 to about 90:10, are incorporated into the process of making the toner where there is high pigment and wax loading such that the combined loading exceeds, for example, 15 percent by weight. The occurrence of wax protrusions is substantially reduced and particle size distributions less than about 1.30 are obtained.

One important issue regarding this approach is the same as the previously discussed embodiment, that is, that the minimum fix temperature of the resultant toner will again increase due to the wax or waxes having the higher molecular weight and higher melting point.

There are several means by which the two or more waxes may be mixed. In one means, wax dispersions of the two or more waxes are added separately to the toner mixture comprising the latex, the aqueous colorant dispersion, and the gel latex. As a second means, waxes are melted and mixed prior to or during the formation of the wax dispersion in an emulsification process such as, for example, homogenization. In the said emulsification process, the waxes are melted and subjected to high intensity dispersion and mixing of the waxes in the presence of a stabilizer such as, for example, a surfactant resulting in a stable dispersion upon cooling containing said mixture of waxes. The said waxes can be optionally melt mixed in a melt mixing device such as an extruder or melt mixer prior to emulsification in a homogenizer to improve the degree of mixing of the said waxes in the wax dispersion.

In the case wherein the wax dispersions are added separately as, for example, a low molecular weight wax such as POLYWAX® 725 and a high molecular weight wax such as POLYWAX® 1000, one expects that upon mixing one should obtain approximately the same effect as in using an intermediate molecular weight wax such as, for example, POLYWAX® 850, because in both cases about the same amount of wax is molten at 93° C., and therefore about the same amount should recrystallize and grow in size. However, it was surprisingly discovered that the performance of the toner with the said mixture of the POLYWAX® 725 and 1000 is no better than the toner with POLYWAX® 725 alone.

Examples of some embodiments of the present invention will now be set forth and explained. The scope of the claims is not limited to, nor meant to be limited to, the following examples.

Latex Reference 1—Non-crosslinked Latex

A latex emulsion comprised of polymer particles generated from the emulsion polymerization of styrene, butyl acrylate and beta carboxy ethyl acrylate ($\beta$-CEA) is prepared as follows. A surfactant solution of about 434 grams of Dowfax 2A1™ (anionic surfactant) and about 387 kilograms of deionized water is prepared by mixing for about 10 minutes in a stainless steel holding tank. The holding tank is then purged with nitrogen for about 5 minutes before transferring the mixture into a reactor. The reactor is then continuously purged with nitrogen while being stirred at about 100 revolutions per minute. The reactor is then heated to about 80° C. Separately, about 6.11 kilograms of ammonium persulfate Initiator are dissolved in about 30.2 kilograms of deionized water. Separately, a monomer emulsion is prepared by mixing about 315.7 kilograms of styrene, about 91.66 kilograms of butyl acrylate, about 12.21 kilograms of $\beta$-CEA, about 7.13 kilograms of 1-dodecanethiol, about 1.42 kilograms of decanediol diacrylate (ADOD), about 8.24 kilograms of Dowfax 2A1® anionic surfactant, and about 193 kilograms of deionized water. About five percent of the above emulsion is then slowly fed into the reactor containing the aqueous surfactant phase at about 80° C. to form the seeds, wherein the "seeds" refer, for example, to the initial emulsion latex added to the reactor, prior to the addition of the Initiator solution, while being purged with nitrogen. The above initiator solution is then slowly charged into the reactor, forming about 5 to about 12 nanometers of latex "seed" particles. After about 10 minutes, the remainder of the emulsion is continuously fed in using metering pumps. Once all of the above monomer emulsion is charged into the main reactor, the temperature is maintained at about 80° C. for about an additional 2 hours to complete the reaction. The reactor contents are then cooled down to about 25° C. The resulting isolated product comprises about 40 weight percent of submicron, about 200 nanometer resin particles of styrene/butylacrylate/$\beta$-CEA suspended in an aqueous phase containing the above surfactant. The molecular properties resulting for the resin latex throughout are a Mw of about 39,000, Mn of about 10,800 as measured by a gel permeation chromatograph (GPC), and a midpoint glass transition temperature (Tg) of about 55.8° C. as measured by a differential scanning calorimeter (DSC), where the midpoint Tg is defined as the halfway point between the onset and the offset Tg of the polymer.

Latex Reference 2-Gel Latex

A latex emulsion comprised of polymer particles generated from the emulsion polymerization of styrene, butyl acrylate, divinylbenzene (55% grade) and beta carboxy ethyl acrylate ($\beta$-CEA) is prepared as follows. A surfactant solution of about 2.92 kilograms of Neogen RK™ (anionic surfactant) and about 162.0 kilograms of deionized water is prepared by mixing for about 10 minutes in a stainless steel holding tank. The holding tank is then purged with nitrogen for about 5 minutes before transferring the mixture into a reactor. The reactor is then continuously purged with nitrogen while being stirred at about 90 rpm. The reactor is then heated to about 75° C. Separately, about 1.38 kilograms of ammonium persulfate initiator are dissolved in about 14.58 kilograms of deionized water. Separately, a monomer emulsion is prepared by mixing about 52.65 kilograms of styrene, about 28.35 kilograms of butyl acrylate, about 810.0 grams divinylbenzene (55% grade), about 2.43 kilograms of $\beta$-CEA, about 6.80 kilograms of Neogen RK™ anionic surfactant, and about 87.48 kilograms of deionized water. About 1.5 percent of the above emulsion is then slowly fed into the reactor containing the aqueous surfactant phase at about 75° C. to form the seeds, wherein the "seeds" refer, for example, to the initial emulsion latex added to the reactor, prior to the addition of the initiator solution, while being purged with nitrogen. The above initiator solution is then slowly charged into the reactor, forming about 5 to about 12 nanometers of latex "seed" particles. After about 10 minutes, the remainder of the emulsion is continuously fed in using metering pumps. Once all of the above monomer emulsion is charged into the main reactor, the temperature is maintained at 75° C. for about an additional 2 hours to complete the reaction. The reactor contents are then cooled down to about 25° C. The resulting isolated product comprises about 24 weight percent of submicron, about 50 nanometer, resin particles of styrene/butylacrylate/divinylbenzene/$\beta$-CEA suspended in an aqueous phase containing the above surfactant. The molecular properties resulting for the resin latex throughout have a Mw of about 417,500, Mn of about 31,500 as measured by GPC, and a midpoint Tg of about 46.1° C. as measured by DSC.

Emulsion 1—POLYWAX® 725

About 765 grams of POLYWAX® 725 polyethylene wax and about 19 grams of Neogen RK™ anionic surfactant are added to about 3,016 grams of deionized water in a 1 gallon reactor and stirred at about 400 revolutions per minute. The reactor mixture is heated to about 130° C. in order to melt the wax. The aqueous mixture containing the molten wax is then pumped through a Gaulin 15MR piston homogenizer at about 1 liter per minute for a period of about 30 minutes with the primary homogenizing valve full open and the secondary homogenizing partially closed such that the homogenizing pressure is about 1,000 pounds per square inch. Then the primary homogenizing valve is partially closed such that the homogenizing pressure increases to about 8,000 pounds per square inch. The reactor mixture is still kept at about 130° C. and circulated through the homogenizer at about 1 liter per minute for about 60 minutes. Thereafter, the homogenizer is stopped and the reactor mixture is cooled to room temperature at about 15° C. per minute and discharged into a product container. The resulting aqueous wax emulsion is comprised of about 19.0 percent of wax and about 0.5 percent by weight of surfactant and has a volume average diameter of about 241 nanometers as measured with a Honeywell Microtrac® UPA150 particle size analyzer.

Emulsion 2—POLYWAX® 1000

About 1,142 grams of POLYWAX 1000® polyethylene wax and about 28.5 grams of Neogen RK™ anionic surfactant are added to about 2,630 grams of deionized water in a 1 gallon reactor and stirred at about 400 revolutions per minute. The reactor mixture is heated to about 138° C. in order to melt the wax. The aqueous mixture containing the molten wax is then pumped through a Gaulin 15MR piston homogenizer at 1 liter per minute for a period of 30 minutes with the primary homogenizing valve full open and the secondary homogenizing partially closed such that the homogenizing pressure is about 1,000 pounds per square inch. Then the primary homogenizing valve is partially closed such that the homogenizing pressure Increases to about 8,000 pounds per square inch. The reactor mixture is still kept at about 138° C. and circulated through the homogenizer at about 1 liter per minute for about 60 minutes. Thereafter, the homogenizer is stopped and the reactor mixture is cooled to room temperature at about 15° C. per minute and discharged into a product container. The resulting aqueous wax emulsion is comprised of about 28.1 percent of wax and about 0.7 percent by weight of surfactant and has a volume average diameter of about 255 nanometers as measured with a Honeywell Microtrac® UPA150 particle size analyzer.

Emulsion 3—POLYWAX® 725+POLYWAX® 1000

About 571 grams of POLYWAX® 725 polyethylene wax, about 190 grams of POLYWAX 1000® polyethylene wax and about 19 grams of Neogen RK™ anionic surfactant are added to about 3,020 grams of deionized water in a 1 gallon reactor and stirred at about 400 revolutions per minute. The reactor mixture is heated to about 132° C. in order to melt the wax. The aqueous mixture containing the molten wax is then pumped through a Gaulin 15MR piston homogenizer at about 1 liter per minute for a period of about 30 minutes with the primary homogenizing valve full open and the secondary homogenizing partially closed such that the homogenizing pressure is about 1,000 pounds per square inch. Then the primary homogenizing valve is partially closed such that the homogenizing pressure increases to about 8,000 pounds per square inch. The reactor mixture is still kept at about 132° C. and circulated through the homogenizer at about 1 liter per minute for about 60 minutes. Thereafter, the homogenizer is stopped and the reactor mixture is cooled to room temperature at about 15° C. per minute and discharged into a product container. The resulting aqueous wax emulsion is comprised of about 18.9 percent of wax and about 0.5 percent by weight of surfactant and has a volume average diameter of 251 nanometers as measured with a Honeywell Microtrac® UPA150 particle size analyzer.

EXAMPLE I

Toner with Emulsion 1 (POLYWAX® 725)

About 191.4 grams of the latex of Latex Reference 1, about 73.7 grams of the gel latex of Latex Reference 2, about 85.2 grams of aqueous wax Emulsion 1 as set forth above containing about 16.2 grams POLYWAX® 725 and about 0.4 grams Neogen RK™ anionic surfactant are added to about 459.2 grams of deionized water in a vessel and stirred using an IKA Ultra Turrax® T50 homogenizer operating at about 4,000 revolutions per minute. Thereafter, about 113.5 grams of black pigment dispersion containing about 18.0 grams Regal® 330 carbon black and about 1.3 grams Neogen RK™ anionic surfactant is added to the above mixture followed by drop-wise addition of about 30.6 grams of a flocculent mixture containing about 3.1 grams polyaluminum chloride mixture and about 27.5 grams 0.02 molar nitric acid solution. As the flocculent mixture is added drop-wise, the homogenizer speed is increased to about 5,200 revolutions per minute and homogenized for about an additional 5 minutes. Thereafter, the mixture is transferred to a 2 liter glass reactor and heated at about 1° C. per minute to a temperature of about 49° C. and held there for a period of about 1.5 to about 2 hours resulting in a volume average particle diameter of about 5 microns as measured with a Coulter Counter. During the heat up period, the stirrer is run at about 250 revolutions per minute and about 10 minutes after the set temperature of about 49° C. is reached, the stirrer speed is reduced to about 220 revolutions per minute. About an additional 124.6 grams of Latex Reference 1 is added to the reactor mixture and allowed to aggregate for an additional period of about 30 minutes at about 49° C. resulting in a volume average particle diameter of about 5.5 microns. The particle size is frozen by adjusting the reactor mixture pH to about 7 by adding about 1.0 molar sodium hydroxide solution. Thereafter, the reactor mixture is heated at about 1° C. per minute to a temperature of about 93° C., followed by adjusting the reactor mixture pH to about 4.5, then about 30 minutes later to about 4.1 and then about 30 minutes later to about 4.0 by adding about 0.3 molar nitric acid solution. Following this, the reactor mixture is continued to be stirred at about 93° C. for about 4 hours to enable the particles to coalesce and spherodize. The reactor heater is then turned off and the reactor mixture is allowed to cool to room temperature overnight, typically for about 10 to about 12 hours. The resulting toner mixture is comprised of about 16.7 percent of toner, 0.4 percent of anionic surfactant and about 82.7 percent by weight of water. The toner of this mixture comprises about 81 percent of styrene/butyl acrylate/beta carboxy ethyl acrylate copolymer, about 10 percent of pigment and about 9 percent by weight of wax, and has a volume average particle diameter of about 6.0 microns and a volume particle size distribution (GSDv) of about 1.25 as shown in Table 1. The toner has significant wax protrusions as characterized by scanning electron microscopy. Fusing results show that the toner has a minimum fix temperature of about 163° C., a hot offset temperature greater than about 210° C., and a fusing latitude greater than about 47° C. as shown in Table 2.

EXAMPLE II

Toner with Emulsion 1 (POLYWAX® 725)

The same procedure as Example 1 adding Emulsion 1 comprising POLYWAX® 725 is followed, except that after the toner particles are coalesced and spherodized at about pH of 4.0 at about 93° C., the reactor heat is turned off and crushed ice is added to the reactor mixture to rapidly cool the mixture to room temperature. Thus, the only difference between Example 1 and Example 2 is the rate of cooling. The toner of this mixture comprises about 81% of styrene/butyl acrylate/beta carboxy ethyl acrylate copolymer, about 10% of pigment and about 9% by weight of wax, and has a volume average particle diameter of about 5.5 microns and a GSDv of about 1.19. The toner has substantially fewer wax protrusions than in Example 1, as observed using scanning electron microscopy (SEM). Fusing results show that the toner has a minimum fix temperature of about 162° C., a hot offset temperature greater than about 210° C., and a fusing latitude greater than about 48° C.

TABLE 1

| Example | Wax | Rate of cooling | Vol. Avg. Dia. (microns) | GSDv |
|---------|-----|-----------------|--------------------------|------|
| I | POLYWAX ® 725 | Slow | 6.0 | 1.25 |
| II | POLYWAX ® 725 | Fast | 5.5 | 1.19 |

As shown in Table 1, a reduction of wax protrusions is more significant with the quenched toner of Example II than the slow cooled toner of Example I. Further, this also results in a narrower toner particle size distribution as shown in Table 1 since there are fewer wax protrusions in Example II.

EXAMPLE III

Toner with Emulsion 2 (POLYWAX® 1000)

About 191.4 grams of the latex of Latex Reference 1, about 73.7 grams of the gel latex of Latex Reference 2, about 59.1 grams of aqueous wax Emulsion 2 as set forth above containing about 16.2 grams POLYWAX® 1000 and about 0.4 grams Neogen RK™ anionic surfactant are added to about 485.3 grams of deionized water in a vessel. After this, the same procedure is followed as in Example I. Thus, the only difference between Example I and Example III is the type of wax. The toner of this mixture comprises about 81 percent of styrene/butyl acrylate/beta carboxy ethyl acrylate copolymer, about 10 percent of pigment and about 9 percent by weight of wax, and has a volume average particle diameter of about 56 microns and a GSDv of about 1.20. The toner has substantially no wax protrusions as observed by scanning electron microscopy (SEM). Fusing results show that the toner has a minimum fix temperature of about 167° C., a hot offset temperature greater than about 210 C., and a fusing latitude greater than about 43° C.

TABLE 2

| Example | Wax | Vol. Avg. Dia. (microns) | GSDv | Min. Fix Temp (° C.) |
|---------|-----|--------------------------|------|----------------------|
| I | POLYWAX ® 725 | 6.0 | 1.25 | 163 |
| III | POLYWAX ® 1000 | 5.6 | 1.20 | 167 |

The results shown in Table 2 indicate that a reduction of wax protrusions is more significant with the toner containing the higher molecular weight POLYWAX® 1000 of Example III than the toner containing POLYWAX® 725 of Example I. Further, a corresponding result of the reduction in wax protrusions is a narrower toner particle size distribution, but also an increased minimum fix temperature as shown in Table 2.

EXAMPLE IV

Toner with Emulsion 1 (POLYWAX® 725)

The same procedure as Example 1 adding Emulsion 1 comprising POLYWAX® 725 is followed, except after the particles size are frozen by adjusting the reactor mixture pH to about 7 by adding 1.0 molar sodium hydroxide solution, the reactor mixture is heated at about 1° C. per minute to a temperature of about 93° C., followed by adjusting the reactor mixture pH to about 3.9, then about 30 minutes later to about 3.5 and then about 30 minutes later to about 3.3 by adding 0.3 molar nitric acid solution. Thus, the only difference between Example I and Example IV is the pH values. The toner of this mixture comprises about 81 percent of styrene/butyl acrylate/beta carboxy ethyl acrylate copolymer, about 10 percent of pigment and about 9 percent by weight of wax, and has a volume average particle diameter of about 6.0 microns and a GSDv of about 1.37 as shown in Table 3. The toner has substantially similar significant wax protrusions as in Example I as observed using scanning electron microscopy (SEM). Fusing results show that the toner has a minimum fix temperature of about 163° C., a hot offset temperature greater than about 210° C., and a fusing latitude greater than about 47° C.

EXAMPLE V

Toner with Emulsion 1 (POLYWAX® 725)+
Emulsion 2 (POLYWAX® 1000)

The same procedure as described in Example IV is followed, except instead of adding aqueous Emulsion 1 comprising POLYWAX® 725 alone, about 63.8 grams of aqueous wax Emulsion 1 comprising about 12.15 grams POLYWAX® 725 and about 0.3 grams Neogen RK™ anionic surfactant, and about 14.4 grams of aqueous wax Emulsion 2 containing about 4.05 grams POLYWAX 1000® and about 0.1 grams Neogen RK™ anionic surfactant were added. The toner of this mixture comprises about 81 percent of styrene/butyl acrylate/beta carboxy ethyl acrylate copolymer, about 10 percent of pigment and about 9 percent by weight of wax, and has a volume average particle diameter of about 6.6 microns and a GSDv of about 1.37 as shown in Table 3. The toner has slightly fewer wax protrusions than in Example IV as observed by scanning electron microscopy (SEM). Fusing results show that the toner has a minimum fix temperature of about 165° C., a hot offset temperature greater than about 210° C., and a fusing latitude greater than about 45° C.

EXAMPLE VI

Toner with Emulsion 3 (POLYWAX® 725+
POLYWAX® 1000)

The same procedure as described in Example IV is followed, except instead of adding aqueous Emulsion 1 comprising POLYWAX® 725 alone, about 85.6 grams of aqueous wax Emulsion 3 comprising about 12.15 grams POLYWAX® 725, about 4.05 grams POLYWAX® 1000, and about 0.4 grams Neogen RK™ anionic surfactant is added. The toner of this mixture comprises about 81 percent of styrene/butyl acrylate/beta carboxy ethyl acrylate copolymer, about 10 percent of pigment and about 9 percent by weight of wax, and has a volume average particle diameter of about 6.0 microns and a GSDv of about 1.31 as shown in Table 3. The toner has significantly fewer wax protrusions than in Example IV as characterized by scanning electron microscopy. Fusing results show that the toner has a minimum fix temperature of about 165° C., a hot offset temperature greater than about 210° C., and a fusing latitude greater than about 45° C.

TABLE 3

| Example | Wax | Vol. Avg. Dia. (microns) | GSD |
|---|---|---|---|
| IV | POLYWAX ® 725 | 6.0 | 1.37 |
| V | POLYWAX ® 725 and 1000 mixed after homogenization | 6.6 | 1.37 |
| VI | POLYWAX ® 725 and 1000 mixed before homogenization | 6.0 | 1.31 |

The results of Table 3 indicates that a reduction of wax protrusions is more significant with a uniform dispersion of POLYWAX® 725 and POLYWAX® 1000 in a 75:25 weight ratio, than in the case where the two waxes are introduced separately to the toner formulation. Further, the reduction in wax protrusions corresponds to a narrower toner particle size distribution as shown in Table 3.

Toner in accordance with the embodiments of the present invention can be used in a variety of imaging devices including printers, copy machines, and the like.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A process of making an emulsion aggregation toner having a reduction of wax protrusions comprising:
   (i) blending a latex, an aqueous colorant dispersion, a wax dispersion and a gel latex, wherein the latex comprises a non-crosslinked resin suspended in an aqueous phase in the presence of an ionic surfactant and water, the aqueous colorant dispersion comprises a colorant, water, and an ionic surfactant, the wax dispersion comprises at least one wax having a molecular weight between about 500 and about 2,500, water, and an ionic surfactant, and the gel latex comprises crosslinked resin particles suspended in an aqueous phase in the presence of an ionic surfactant and water;
   (ii) mixing the above blend with a coagulant;
   (iii) heating the mixture below about, or about equal, to the glass transition temperature (Tg) of the non-crosslinked resin to form an aggregated suspension;
   (iv) adding a base to increase the pH;
   (v) heating to above about the glass transition temperature (Tg) of the non-crosslinked resin to coalesce the said aggregated suspension;
   (vi) lowering the pH with an acid; and
   (vii) cooling to about room temperature.

2. The process according to claim 1, further comprising adding a second latex after heating the mixture in step (iii), wherein the second latex comprises a second non-crosslinked resin suspended in an aqueous phase containing an ionic surfactant and water.

3. The process according to claim 2, wherein the second latex is present in an amount of about 10 to about 40 percent, and forms a shell over toner aggregates such that the shell has a thickness of about 0.2 to about 0.8 micrometers.

4. The process according to claim 1, wherein the wax has a molecular weight between about 600 and 2,000 and has a particle size in the range of about 50 to about 250 nanometers.

5. The process according to claim 1, wherein a particle size of the latex, the colorant dispersion and the gel latex is from about 50 to about 250 nanometers.

6. The process according to claim 1, wherein the non-crosslinked resin is selected from the group consisting of poly(styrene-alkyl acrylate), poly(styrene-1,3-diene), poly (styrene-alkyl methacrylate), poly(styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid) and poly(styrene butyl acrylate beta carboxyl ethyl acrylate).

7. The process according to claim 1, wherein the crosslinked resin is selected from the group consisting of crosslinked poly(styrene-alkyl acrylate), poly(styrene-butadiene), poly(styrene-isoprene), poly(styrene-alkyl methacrylate), poly(styrene-alkyl acrylate-acrylic acid), poly(styrene-butadiene-acrylic acid), poly(styrene-isoprene-acrylic acid), poly(styrene alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly (styrene-alkyl acrylate-acrylonitrileacrylic acid), poly(alkyl acrylate-acrylonitrile-acrylic acid) and poly(styrene butyl acrylate beta carboxyl ethyl acrylate).

8. The process according to claim 1, wherein the wax is selected from the group consisting of natural vegetable waxes, natural animal waxes, mineral waxes and synthetic waxes.

9. The process according to claim 8, wherein the natural vegetable waxes are selected from the group consisting of carnauba wax, candelilla wax, Japan wax and bayberry wax, the natural animal waxes are selected from the group consisting of beeswax, punic wax, lanolin, lac wax, shellac wax and spermaceti wax, the mineral waxes are selected from the group consisting of paraffin wax, microcrystalline wax, montan wax, ozokerite wax, ceresin wax, petrolatum wax and petroleum wax, and the synthetic waxes are selected from the group consisting of Fischer-Tropsch wax, acrylate wax, fatty acid amide wax, silicone wax, polytetrafluoroethylene wax, polyethylene wax and polypropylene wax.

10. The process according to claim 1, wherein the coagulant is a polyaluminum chloride or a polymetal silicate present in an amount of about 0.02 to about 0.3 percent by weight of the toner.

11. A process of making an emulsion aggregation toner having a reduction of wax protrusions comprising:
   (i) blending a latex, an aqueous colorant dispersion, a wax dispersion and a gel latex, wherein the latex comprises a non-crosslinked resin suspended in an aqueous phase in the presence of an ionic surfactant and water, the aqueous colorant dispersion comprises a colorant, water, and an ionic surfactant, the wax dispersion comprises at least two waxes each having different molecular weights between about 500 and about 2,500, water, and an ionic surfactant, and the gel latex comprises crosslinked resin particles suspended in an aqueous phase in the presence of an ionic surfactant and water;
   (ii) mixing the above blend with a coagulant;
   (iii) heating the mixture below about, or about equal, to the glass transition temperature (Tg) of the non-crosslinked resin to form an aggregated suspension;

(iv) adding a base to increase the pH;

(v) heating to above about the glass transition temperature (Tg) of the non-crosslinked resin to coalesce said aggregated suspension;

(vi) lowering the pH with an acid; and (vii) cooling to about room temperature.

12. The process according to claim 11, further comprising adding a second latex after heating the mixture in step (iii), wherein the second latex comprises a second non-crosslinked resin suspended in an aqueous phase containing an ionic surfactant and water.

13. The process according to claim 11, wherein the at least two waxes are melted and mixed together, emulsified and cooled to make the wax dispersion.

14. The process according to claim 11, wherein the at least two waxes have molecular weights between about 600 and 2,000 and have particle sizes in the range of about 50 to about 500 nanometers.

15. The process according to claim 11, wherein a ratio of the two waxes is from 10:90 to 90:10.

16. The process according to claim 15, wherein the ratio of the two waxes is from 25:75 to 75:25.

17. The process according to claim 15, wherein the ratio is a weight ratio or a volume ratio.

18. An emulsion aggregation toner having a reduction of wax protrusions comprising a latex, an aqueous colorant dispersion, a wax dispersion and a gel latex, wherein the wax dispersion comprises at least one wax having a molecular weight between about 500 and about 2,500.

19. The toner according to claim 18, wherein the wax dispersion comprises at least two waxes melted and substantially uniformly dispersed together, each having a different molecular weight between about 500 and about 2,500.

20. The toner according to claim 19, wherein the at least two waxes are dispersed together in a ratio of about 25:75 to about 75:25.

21. A printing device comprising the toner having a reduction of wax protrusions according to claim 18.

* * * * *